Oct. 6, 1959  R. B. MACPHERSON  2,907,065
WIPER BLADE ASSEMBLY
Filed Aug. 1, 1957

INVENTOR.
ROBERT B. MACPHERSON
BY
Redrow & Recktenwald
ATTORNEYS

United States Patent Office 2,907,065
Patented Oct. 6, 1959

2,907,065

WIPER BLADE ASSEMBLY

Robert B. Macpherson, Hobart, Ind., assignor to The Anderson Company, a corporation of Indiana Application August 1, 1957, Serial No. 675,718

8 Claims. (Cl. 15—245)

This invention relates generally to windshield wiper apparatus and more particularly is directed to a novel wiper blade assembly.

Currently, the majority of wiper blade apparatus used on both flat and curved surfaces of windshields comprise a flexible backed blade and a pressure-distributing device operatively connected to the blade in such a manner as to substantially distribute the pressure from the windshield wiper arm evenly over the surface of the blade, such as is covered by U.S. Patent No. 2,596,063 issued May 6, 1952 to J. W. Anderson. Use of this basically new type of blade has produced profound results in the efficient cleaning of windshields that has contributed immeasurably to the improved safety of the modern-day motor vehicle.

In assembling and using the above-referred-to blades and improvements thereto, it has become desirable to accommodate for certain tolerances in the parts and to simultaneously reduce the noise level of operation of the finished blade. Current construction of wiper blades calls for a flexible backing member comprising metal flexors which are either one-piece or two-piece elements. In manufacturing the flexors, the plus and minus tolerances in the width of the elongate side portions thereof, together with the amount of warp and distortion created by heat-treating same, presents problems in assembly that causes many rejects with the resulting increase in cost. That is, when the flexors are being assembled in the grooves of the rubber element, with one edge bearing against the relatively solid neck of rubber between the grooves, it is possible to have the width deviation in the flexors with maximum-plus tolerances and maximum-allowable warpage to be accumulative in the same direction so as to project the outer edges of the flexors beyond the sides of the blade to such an extent that it will be substantially impossible to assemble the blade with its pressure-distributing device. In some cases, it may be possible with sufficient side pressure to force the flexors into the groove far enough to affect the assembly; however, in other cases, the narrow neck of rubber between the flexors, which is substantially incompressible, cannot be distorted sufficiently thereby rendering it impossible to assemble the pressure device to the blade.

As a further problem, when assembling the flexible backing member with the blade wherein the width of each side of the member has the maximum-minus tolerances, a very loose connection will result when the pressure device is attached which will cause rattling in the assembled device and may permit excessive roll-over of the blade or even disassembly of the blade in use.

More specifically, it is an object of this invention to overcome the above-noted disadvantages and to provide a wiper blade having structure that simplifies the assembly of the blade without detracting from the efficiency thereof.

Another significant object of this invention is to provide an improved wiper blade assembly wherein the noise and vibration occurring between the movable components of the assembly are reduced to a minimum.

Still a further object of this invention is to provide an improved wiper blade assembly wherein resilient means formed in the wiper element of the blade serve to retain the flexible support means in seated relation with the receiving means of the pressure-distributing device.

An additional object of this invention is to provide an improved wiper blade assembly wherein some of the materials used in constructing the blade may be permitted to have a wider range of tolerances without detracting from the quality of the finished product.

A further object of this invention is to provide an improved wiper blade assembly that is less expensive to produce and more efficient in use.

Other objects and advantages of the invention will become evident when the description herein set forth is considered in conjunction with the drawings annexed hereto.

Figure 1:
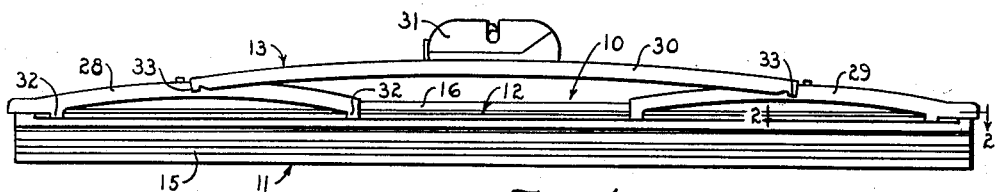
Figure 1 is a side elevational view of a windshield wiper blade embodying the features of the present invention.

The wiper blade assembly 10 as exemplified in the drawings comprises a resilient wiper element 11, an elongate uniformly flexible support 12 detachably secured thereto, and a pressure-distributing device 13. The resilient wiper element 11 is composed of two parts, a wiper head portion 15 and an attaching or back portion 16 joined together by a thin intermediate hinge 17 so that the wiping head portion may move laterally with respect to the back portion when the blade is moved back and forth across the windshield. The wiper head portion 15 has several outwardly extending edge portions 19 tapered gradually downwardly to a surface-contacting wiping edge 20 adapted to contact a windshield for cleaning the surface of same.

The back portion 16 of the wiper element has a vertical dimension, in its illustrated form, of substantial thickness and has a pair of matching grooves 22, 23 formed in the opposite sides thereof extending substantially the full length of said back portion. Each groove is defined by a pair of side walls 24 and 25, a back wall 26, and end walls 27. The shape of each groove is such as to provide a nest or seating area for the flexors, as will appear more fully hereinafter. It is to be understood, however, that the location or shape of the groove and the type of wiper element 11 is not to be considered as part of the invention and the scope of the claims is not to be limited thereby.

Fastened on the back portion 16 of the wiper element 15 is a pressure-distributing device 13 which is adapted to engage the wiper blade in a manner to evenly distribute the pressure from the wiper arm along the full length of the blade. The pressure-distributing device may be constructed in various ways, but as herein illustrated preferably includes a pair of corresponding secondary yokes 28 and 29 and a primary yoke 30. A connector 31 of any suitable form may be fixedly carried at about the midpoint of said primary yoke or bridge 30 for detachably connecting the blade assembly to a wiper arm (not shown).

The ends of the secondary yokes are provided with receiving means or claws 32 adapted to be connected to the blade at longitudinally spaced points or locations and the ends 33 of the primary yoke 30 are removably connected to intermediate portions of the secondary yokes 28 and 29.

The back walls 26 of the grooves 22, 23 in the back portion 16 of the wiper element are disposed substantially parallel to and spaced from each other a distance substantially equally distributed on opposite sides of the median line of the blade. The portion 34 between the walls 26 is formed of rubber and is trapped between the parts of the backing element 12 so as to be substantially incompressible. A plurality of substantially equally spaced and substantially triangularly shaped abutments or pad means 35 extend outwardly from said walls 26 such that their apices extend into and are confined within the open area of the grooves. It is to be understood that the shape of the pads or abutments 35 could be other than that illustrated or described without departing from the spirit of this invention. The pad means 35 extend from the side wall 24 to the side wall 25 of the groove across the back wall 26 in such a way that any element seated in the groove will bear against said pad means. In the preferred form, the pad means are molded into the grooves at the same time that the rest of the blade is molded so as to be formed integrally with the rubber of the backing portion 16.

Positioned within the grooves 22, 23 are the flexor means 37 which receive the force or pressure from the arm and yoke system for distribution uniformly to the wiping edge of the blade. The flexor means 37 is designed to be substantially uniformly flexible throughout its length in a direction perpendicular to the surface of the windshield and to be substantially rigid in a direction parallel to the surface of the windshield. With the flexor means 37 constructed as just described, the forces from the wiper arm will be transmitted to the wiper element in such a way as to effect efficient cleaning of the windshield.

In the illustrated form of the invention, a flexor system is shown wherein antifriction elements or means 38 are combined with the uniformly flexible elements 39 such that better surface conformity can be attained. One of the uniformly flexible elements 39 of the flexor means is positioned in each of the grooves 22, 23 with the inner edge portion 40 in contact with the outer edge of each pad means 35. The elements 39 are preferably formed of a flat striplike piece of resilient metal. The flat side of the elements 39 are disposed in the grooves in contact with the side wall 24 thereof and are disposed substantially parallel to the wiping edge of the blade to provide flexing for the blade perpendicular to the surface being wiped.

Figure 2:
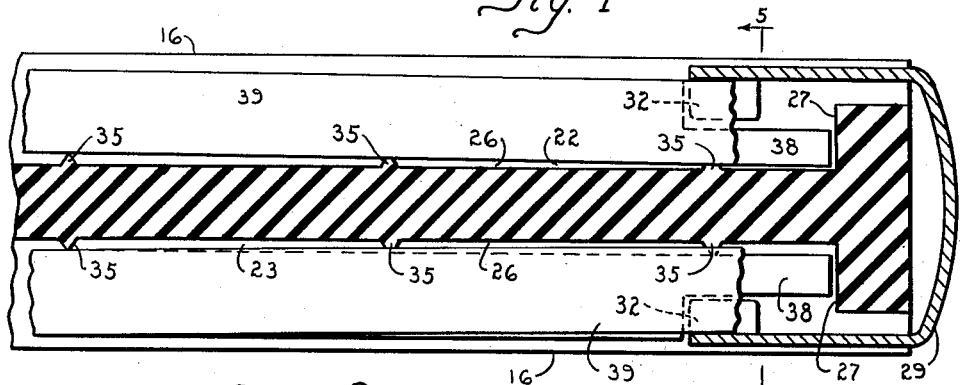
Figure 2 is a cross-sectional view of the blade taken along the line 2—2 of Figure 1.
Figure 3:
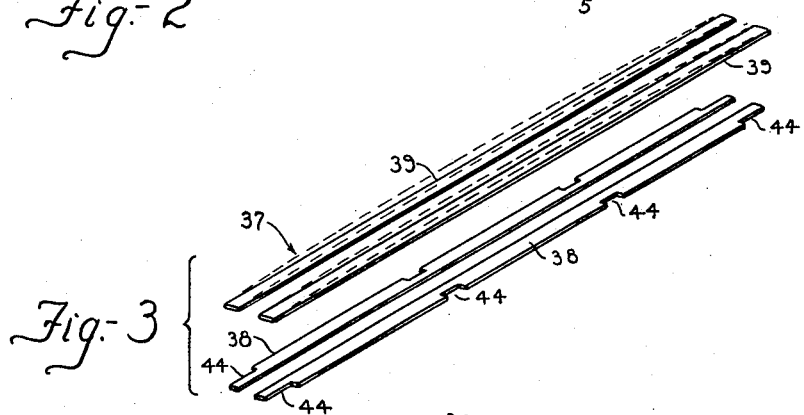
Figure 3 is a perspective view of the flexible supports forming a part of the illustrated form of the present invention.
Figures 4, 5:
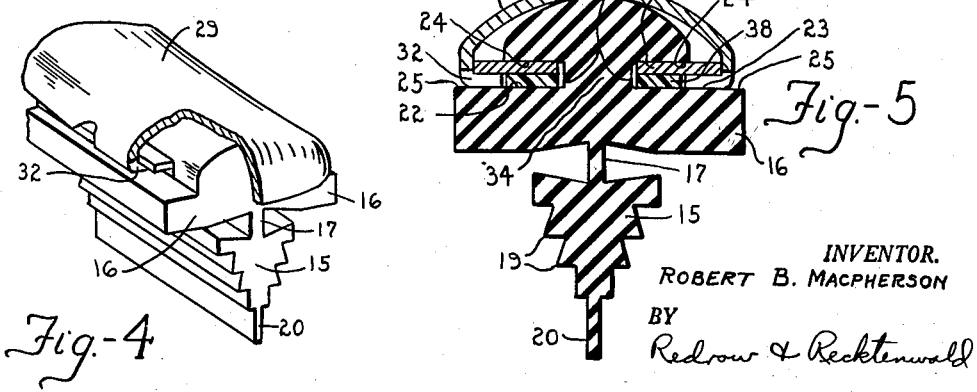
Figure 4 is a perspective view of one end portion of a wiper blade with parts broken away as illustrated in Figure 1.
Figure 5 is a cross-sectional view taken on the line 5—5 of Figure 2.

The uniformly flexible elements 39, as best illustrated in Figures 3 and 5, are separated from the bottom walls 25 of the grooves 22 or 23 by antifriction spacer elements 38. These spacer elements are preferably formed of plastic and, in addition to their spacing function, they serve to reduce the friction drag between the bottom wall 25 of the grooves and the bottom face of the flexible element 39. This will permit the blade to flex more easily as it conforms to an irregular surface being wiped whereby little, if any, energy is lost through the frictional drag. This application is not intended to claim as part of its invention any of the structure relative to the specific antifriction means 38 shown and described. The antifriction bearing elements 38, when juxtaposed in the grooves 22, 23, bear against the outer edge of the plurality of pad means 35 for a purpose that will become apparent hereinafter. The flexible elements 39 and the antifriction elements 38 are held in the grooves 22, 23 by the claws 32 of the secondary yokes 28, 29. The inner ends of the claws 32 engage under the flexible element 39 with the ends of the claws fitting into notches 44 in the antifriction elements 38, the edges of the notches being spaced longitudinally from the claws as best shown in Figure 2 such that limited relative movement may take place between the claws on the yokes and the wiping element as the wiping element flexes to accommodate itself to the curvature of the surface being wiped.

In manufacturing the resilient elements 39, certain plus and minus tolerances are allowed in thickness and in width. The greater the allowable manufacturing tolerances, the cheaper the cost of producing the material for the elements will be, since the quality control necessary to produce the material for the elements will be reduced. The elements are also permitted a wider range of control as far as the amount of warp or bend permitted throughout the length of a selected unit, as shown between the solid-line and dotted-line positions of Figure 3. With the resilient elements 39 and antifriction elements 38 assembled in the grooves 22 and 23, one edge portion of each of the elements will bear against the plurality of pad means 35. In the event that the flexible elements 38 and 39 have a relatively large plus tolerance in width, it will be necessary, in order to assemble the claws 32 of the secondary yokes 33 with the flexor means, to substantially depress the pad means as shown in the right-hand portion of Figure 2 so as to permit reception of the flexor means within the lateral confines of the secondary yoke. Since the pad means 35 are of relatively thin cross section and have an area within which they can be depressed, it will be possible to move the flexor means into the grooves to complete the assembly of the secondary yokes with the blade.

In prior constructions, without the use of the pad means 35 the rubber portion 34 between the inner walls 26 of the grooves 22, 23 would not afford any substantial deflection in a lateral direction whereby excessively wide flexor means could be tolerated. It has been found, as a practical matter, that the rubber material 34 lying between the top portion 46 and the bottom portion 47 of the back portion 16 of the blade is relatively incompressible and rubber, in order to be deformed, has to have an area to deform into. Since no such area is provided for the portion 34 between the grooves, it is practically impossible to deform said portion to assist in assembling the flexor means with the secondary yokes of a wiper system.

As an added feature, since the pad means 35 continue to bear against the inner edges of flexor means, the pads 35 will have a tendency to load the flexor means 37 radially outwardly from the center of the blade and into firm contact with the claws on the ends of the secondary yokes. In this way, the looseness between the secondary yokes and the blade member is eliminated and rattling and roll-over disassembly of the blade superstructure from the wiping element is prevented.

Since the outer confines of the secondary yokes and claws thereon are disposed within the outer marginal edges of the rubber backing element of the blade, scratching of a windshield is substantially eliminated. The top portion 46 of the back portion 16 of the rubber wiper element is shaped so as to partially expose the upper portion of the flexible elements 39 and still bear against the underside of the end portions of the secondary yokes 28, 29 to add vertical resistance between the bridge structure and the blade to further eliminate chatter between the blade and the superstructure.

The pad means 35 further permit a greater allowable minus tolerance in the width of the flexible elements 39 since disposition of such an element in the grooves will only partially depress the pad means 35 and still be held in firm engagement with the inner sides of the claws of the secondary yokes. As a result of this invention, it is possible to use material for flexors that previously had to be rejected for deviations beyond the allowable limits necessarily created by the limitations placed on the construction by assembly requirements.

It is to be understood that this invention is not limited in use to two-piece flexors or to the use of antifriction elements. It is contemplated that the pad means 35 can be used with one-piece flexors as well as with internally mounted flexors without departing from the spirit of the invention.

While the above description covers the preferred form of this invention, it is to be understood that modifications thereof may occur to those skilled in the art which will fall within the scope of the following claims.

I claim:

1. A wiper for curved glass comprising an elongate resilient one-piece body having a wiping portion joined to an enlarged backing portion, said backing portion having opposed grooves formed in its opposite sides, the bottom of each groove being defined by a longitudinally extending wall which is spaced from, back to back and substantially parallel with the corresponding wall of the other groove, and a plurality of longitudinally spaced resilient elements formed on said walls of the grooves and projecting into the open area of the grooves.

2. In a wiper assembly comprising an elongate resilient wiper element having a wiper head portion and a back portion, opposite sides of said back portion being formed with a pair of parallel elongate grooves extending substantially the full length thereof, there being a plurality of spaced resilient projections formed on the inner wall of each groove, a pair of elongate flexible support mean, one of said support means being nested in each of said grooves and having its inner edge engaging with said projections, whereby the projections urge the support means into snug engagement with the attaching means of a pressure device.

3. A windshield wiper blade assembly comprising a blade and a pressure device, said blade being provided with a pair of blind grooves formed in the opposite sides thereof, projecting resilient pad means formed on the back wall of each groove, means seated in said grooves against said pad means and being flexible in one plane and substantially rigid in a plane perpendicular thereto, and means formed on the pressure device engaging with said means in said grooves for attaching the pressure device to the blade.

4. A windshield wiper blade assembly comprising an elongate resilient blade having a pair of blind grooves formed down the opposite sides thereof, a plurality of spaced pad means formed on and projecting from the back wall of each groove, a pair of resilient backing strips flexible in one plane and rigid in a plane perpendicular thereto seated in said grooves and having one edge abutting said paid means, a pressure device having a pair of secondary yokes connected together by a primary bridge means, and clip means formed on the end portions of said secondary yokes and extending into engaging relation with the backing strips whereby the wiper blade is assembled to the pressure device.

5. A wiper for curved glass comprising an elongate resilient one-piece body having a wiping portion joined to an enlarged backing portion, said backing portion having opposed grooves formed in its opposite sides, the bottom of each grooves being defined by a longitudinally extending wall which is spaced from and substantially parallel with the corresponding wall of the other groove, a plurality of longitudinally spaced pad means formed on and projecting from said walls of the grooves into the open area of the grooves, elongate flexible supporting means nested in said grooves with the inner edge bearing against the longitudinally spaced pad means in the grooves and a pressure device having means affording connections with said supporting means whereby the supporting means are firmly urged into engagement with the connection means on the pressure device by the pad means.

6. In a wiper assembly comprising an elongate wiper blade having a resilient wiper element and elongate flexible supporting means therefor, there being spaced resilient means on said wiper element engaging with one edge of the supporting means for urging said supporting means outwardly from the wiper element, and a pressure device having means affording connections with said flexible support means at locations along the length of the wiper element whereby said means on said wiper element urge the supporting means into firm engagement with said connection means on the pressure device.

7. A windshield cleaner comprising an elongate continuous squeegee device having elongate flexible means nested in parallel, back-to-back grooves formed along opposite sides thereof so as to be resiliently flexible for movement in a direction perpendicular to a surface to be wiped, a pressure-distributing device operatively connected to the squeegee device at at least three longitudinally spaced locations, and means spaced along said grooves resiliently urging said flexible means into engagement with said pressure device.

8. A wiper for a curved glass comprising an elongate blade of resilient material having a wiping edge extending lengthwise thereof, and an integral enlarged back portion parallel to and substantially coextensive with said edge, said back portion being formed with parallel rectangular grooves lying in the same general plane and opening in opposite directions, the bottoms of said grooves constituting engagement surfaces for elongate, flat flexible means nested in said grooves with their inner edges constituting surfaces for engagement with said surfaces of said grooves, one of said surfaces including a plurality of small projections spaced longitudinally thereof, and a pressure-distributing device engaged with the means in said grooves for attaching the pressure device to the blade.

References Cited in the file of this patent

UNITED STATES PATENTS

| | | |
|---|---|---|
| 2,782,445 | Krohm | Feb. 26, 1957 |
| 2,782,448 | Anderson | Feb. 26, 1957 |
| 2,782,449 | Anderson | Feb. 26, 1957 |

UNITED STATES PATENT OFFICE
CERTIFICATE OF CORRECTION

Patent No. 2,907,065 October 6, 1959

Robert B. Macpherson

It is hereby certified that error appears in the printed specification of the above numbered patent requiring correction and that the said Letters Patent should read as corrected below.

Column 5, line 28, for "mean" read -- means --; line 51, for "paid" read -- pad --; column 6, line 3, for "grooves" read -- groove --.

Signed and sealed this 3rd day of May 1960.

(SEAL)
Attest:

KARL H. AXLINE
Attesting Officer

ROBERT C. WATSON
Commissioner of Patents